Figure 1:
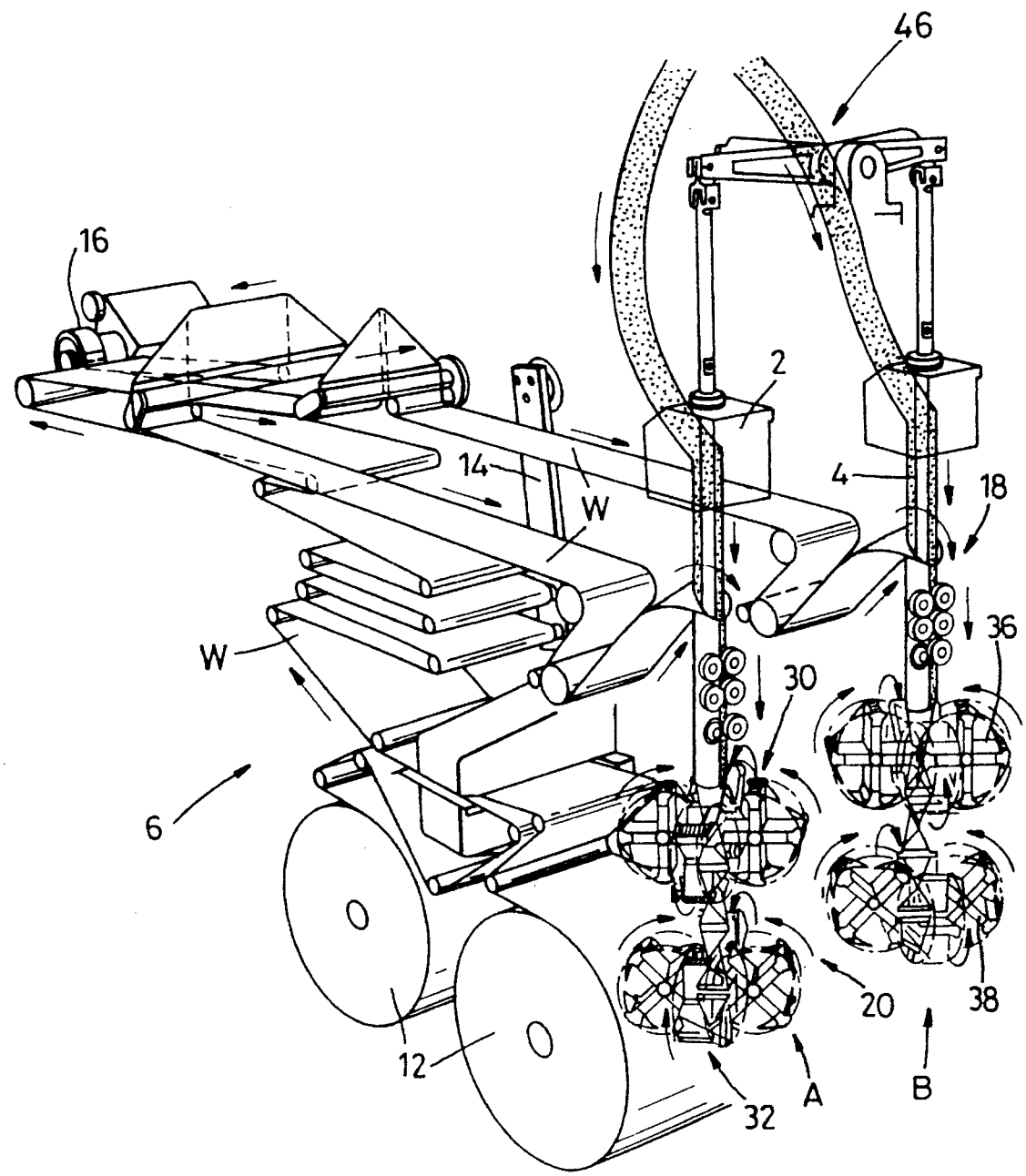

United States Patent [19]

Fincham et al.

[11] Patent Number: 5,548,947
[45] Date of Patent: Aug. 27, 1996

[54] APPARATUS AND METHOD FOR PRODUCING PACKETS

[75] Inventors: Kevin R. Fincham; David R. Seaward; Graham L. Shirley, all of Coventry; Geoffrey W. Vernon, High Wycombe, all of United Kingdom

[73] Assignee: Thomas J. Lipton Co., Englewood Cliffs, N.J.

[21] Appl. No.: 271,296

[22] Filed: Jul. 6, 1994

[30] Foreign Application Priority Data

Jul. 8, 1993 [GB] United Kingdom ............... 9314098

[51] Int. Cl.⁶ .............................. B65B 9/12; B65B 1/06
[52] U.S. Cl. ............................. 53/551; 53/374.4
[58] Field of Search ............... 53/451, 473, 551, 53/552, 554, 503, 374.4

[56] References Cited

U.S. PATENT DOCUMENTS

| | | |
|---|---|---|
| D. 199,935 | 12/1964 | Dykes et al. . |
| 1,489,807 | 4/1924 | Anderson . |
| 1,581,578 | 4/1926 | Kieselbach . |
| 2,027,342 | 1/1936 | Hopkins . |

(List continued on next page.)

FOREIGN PATENT DOCUMENTS

| | | |
|---|---|---|
| 0150689 | 8/1985 | European Pat. Off. . |
| 0157130 | 10/1985 | European Pat. Off. . |
| 0240694 | 10/1987 | European Pat. Off. . |
| 0226693 | 6/1989 | European Pat. Off. . |
| 0255474 | 7/1992 | European Pat. Off. . |
| 2041901 | 2/1971 | France . |
| 2372728 | 6/1978 | France . |
| 2600304 | 12/1987 | France . |
| 248124 | 1/1948 | Germany . |
| 1586328 | 6/1967 | Germany . |
| 2751088 | 9/1985 | Germany . |
| 631381 | 12/1961 | Italy . |
| 63/7602 | 1/1988 | Japan . |
| 63/79303 | 5/1988 | Japan . |
| 63/99804 | 6/1988 | Japan . |
| 63/128966 | 8/1988 | Japan . |
| 63/171371 | 11/1988 | Japan . |
| 3-275409 | 3/1990 | Japan . |
| 3/98870 | 4/1991 | Japan . |
| 3-124519 | 5/1991 | Japan . |
| 3-162221 | 7/1991 | Japan . |
| 3-162222 | 7/1991 | Japan . |
| 5-65130 | 8/1991 | Japan . |
| 4/62664 | 5/1992 | Japan . |
| 4/97072 | 8/1992 | Japan . |
| 543420 | 12/1973 | Switzerland . |
| 573327 | 3/1976 | Switzerland . |
| 75201835 | 2/1975 | Taiwan . |
| 81208629 | 11/1980 | Taiwan . |
| 502266 | 3/1939 | United Kingdom . |
| 827792 | 2/1960 | United Kingdom . |
| 944847 | 12/1963 | United Kingdom . |
| 965615 | 8/1964 | United Kingdom . |
| 1184902 | 3/1970 | United Kingdom . |
| 1392842 | 4/1975 | United Kingdom . |
| 2028253 | 3/1980 | United Kingdom . |
| 1575845 | 10/1980 | United Kingdom . |
| 2087350 | 5/1982 | United Kingdom . |
| 2256415 | 12/1982 | United Kingdom . |
| WO89/00949 | 2/1989 | WIPO . |

OTHER PUBLICATIONS

Abstract of JP 3–124519. (Date May 28, 1991).
Abstract of JP 03/162222. (Date Jul. 12, 1991).
Abstract of JP 03/162221. (Date Jul. 12, 1991).
Abstract of CH 543420 (Date Aug. 19, 1971).
Abstract of FR 2 041 901. (Date Apr. 22, 1969).

*Primary Examiner*—Horace M. Culver
*Attorney, Agent, or Firm*—James J. Farrell

[57] ABSTRACT

Packets are produced by forming a continuous web (W) of packaging material into a tubular form around a tube (4) through which the packet filling material is delivered, the individual packets being sealed and severed from the web as each dose of filling material is delivered. A valve (24) to control the dosing is provided at the exit end of the delivery tube. The sealing and severing of the packets is performed by mutually transverse pairs of rotors (36, 38) the arms (92) of which interdigitate to make successive seals in mutually transverse directions, so forming tetrahedral packets.

24 Claims, 8 Drawing Sheets

U.S. PATENT DOCUMENTS

| | | |
|---|---|---|
| 2,156,466 | 5/1939 | Vogt . |
| 2,328,017 | 8/1943 | Irmscher . |
| 2,533,554 | 12/1950 | Byerly . |
| 2,611,225 | 9/1952 | Williams ................................. 53/554 |
| 2,657,510 | 11/1953 | Lewis . |
| 2,738,631 | 3/1956 | Jarund ................................... 53/551 |
| 2,741,079 | 4/1956 | Rausing et al. . |
| 2,889,671 | 6/1959 | Weisman ............................. 53/554 X |
| 2,962,843 | 12/1960 | Hoelzer et al. ...................... 53/551 X |
| 2,966,021 | 12/1960 | Lane et al. . |
| 3,026,658 | 3/1962 | Schneider et al. . |
| 3,063,211 | 11/1962 | Graves ................................... 53/551 |
| 3,221,978 | 12/1965 | Hoelzer et al. . |
| 3,236,021 | 2/1966 | Wagner et al. . |
| 3,269,079 | 8/1966 | Schmied .............................. 53/551 X |
| 3,320,719 | 5/1967 | Murray ................................... 53/551 |
| 3,522,689 | 8/1970 | Wylie et al. . |
| 3,529,397 | 9/1970 | Leasure . |
| 3,577,301 | 5/1971 | Gustafson . |
| 3,597,222 | 8/1971 | Kalemba . |
| 3,599,387 | 8/1971 | James ................................... 53/551 X |
| 3,629,987 | 12/1971 | Klopfenstein et al. ................ 53/552 |
| 3,731,451 | 5/1973 | Sexstone et al. . |
| 3,820,691 | 6/1974 | Saur ..................................... 53/551 X |
| 3,831,821 | 8/1974 | Doyen ................................... 53/552 X |
| 3,879,917 | 4/1975 | Bassendale et al. .................. 53/552 X |
| 3,892,060 | 7/1975 | Stanley, Jr. ........................... 53/552 X |
| 3,925,959 | 12/1975 | Dykes et al. . |
| 4,064,662 | 12/1977 | O'Toole . |
| 4,067,170 | 1/1978 | Yates, Jr. . |
| 4,074,504 | 2/1978 | Greenawalt et al. . |
| 4,290,521 | 9/1981 | Mitchell et al. . |
| 4,519,184 | 5/1985 | Brunswick .............................. 53/503 |
| 4,524,567 | 6/1985 | Patelli . |
| 4,551,336 | 11/1985 | Chen . |
| 4,566,249 | 1/1986 | Schwerdtel et al. . |
| 4,587,795 | 5/1986 | Yamashita ............................. 53/551 |
| 4,606,174 | 8/1986 | Berg ..................................... 53/551 X |
| 4,608,810 | 9/1986 | Bordini ................................... 53/551 |
| 4,724,657 | 2/1988 | Roovers et al. ....................... 53/551 |
| 4,726,171 | 2/1988 | Kreager et al. . |
| 4,759,170 | 7/1988 | Sawa et al. . |
| 4,947,618 | 8/1990 | Schneider et al. . |
| 5,031,386 | 7/1991 | Schneider . | ated succession at locations spaced along said web, so that it is compartmented by series of mutually transverse seals.

APPARATUS AND METHOD FOR PRODUCING PACKETS

This invention relates to apparatus and methods for producing packets of flowable material.

There have been a number of proposals to package flowable infusion material in packets of tetrahedral shape because of the functional advantages attributed to such a shape as compared with the more conventional flat or pillow shaped infusion packet. Examples of tetrahedral packets for such purposes and their methods of manufacture can be found in GB 2256415A, 2028253A and 1575845 and U.S. Pat. Nos. 4,290,521 and 1,581,578.

The tetrahedral shape has not been widely adopted, however, because of the difficulty of forming and filling the packets, in particular at a high rate of production. In GB 2028253A and U.S. Pat. No. 4,290,521 a continuous production process is described which relies on the so called "flow-wrap" system in which doses of material to be packaged are dropped into a vertical tubular web and in synchronism with the deposition of each dose the web is sealed transversely to compartment the individual doses. Known flow-wrap methods have an inherent speed limitation, however, because the doses are metered and then dropped into the mouth of the tube from above and can only be deposited at a limited rate.

In one of its aspects the present invention is concerned with the dispensing means to be employed to dose a tubular web. According to this aspect of the invention, apparatus is provided for dispensing doses of a flowable material into a tubular web, comprising an elongate conduit for said material, means for drawing a web of packaging material along the exterior of said conduit and past an outlet end thereof, tube-forming means adjacent the conduit for forming said web into a closed tube around the conduit, and valve means at or adjacent said outlet end of the conduit for dispensing doses of said material into the tubular web.

Such an arrangement may be contrasted with the proposal in U.S. Pat. No. 4,290,521 where each dose of infusible material is inserted into the top of a tube around which the tube is being formed. With the relatively fine particulate material that is typical of such infusible materials as tea and coffee, the material tends to disperse as it falls, and the rate of operation must be kept slow enough to ensure the full dose is deposited to maintain accuracy of dosing.

The invention according to another of its aspects, provides a preferred form of dispensing apparatus for doses of a flowable material comprising valve means at or adjacent an exit end of the conduit and connected to reciprocating drive means for expelling said material in discrete doses, the valve means comprising a tapering outlet passage in said conduit adjacent the exit end and a plug member reciprocable in the conduit by said drive means to and from an extended position in which an enlarged portion of the plug member substantially fills a smaller cross-section region of said tapering outlet passage, the movement to said extended position being arranged to expel from said exit end a dose of material allowed to pass said enlarged position. By these means it is possible to avoid or at least substantially reduce the dispersion effects referred to above.

With regard to the production of tetrahedral packets, the transverse sealing of the tube to give a tetrahedral shape is more complicated than for pillow-form packets because successive seals have to be formed transversely to each other. In the prior examples of flow-wrap methods mentioned above, reciprocating heating bars form these seals, but the motion of the web must be stopped each time it is gripped between the bars, which severely limits the rate at which it can be advanced.

GB 2256415A proposes an arrangement in which the tubular web is kept in continuous motion through a sealing and cutting station where two mutually transverse sets of sealing and cutting bars are driven at a 180° phase difference by linkage mechanisms to move in oval orbits. The major axis of each orbit extends transversely to the web and at one end of the motion in the direction of that axis the bars of each pair come together to a clamping position while they are also moving in the same direction as the web, ie. transverse to the major axis. Although the web can be kept moving continuously, reciprocating motion of the kinematic members of the linkage mechanisms limits the speed, and also the rate of production. The arrangement described has the further disadvantage that each pair of bars can only grip the web relatively briefly because of the profile of their motion, which also limits the operating speed because of the time needed to soften and fuse the heat sealing material of the web. This last limitation is intensified by the fact that the mechanism imparts a rocking motion to the bars when they are in the clamping position.

There have also been proposals (U.S. Pat. No. 4,067,170 and JP 3-124519) to form mutually transverse seals at intervals in a continuously moving web by heat sealing means that circulate on endless belts to travel with the web. In U.S. Pat. No. 4,067,170, two mutually transverse pairs of endless belts are provided, cooperating sealing members projecting from the belts of each pair of belts to form the transverse seals in the tubular web and the pairs of belts inter-digitating so that successive seals are formed mutually transversely on the tubular web. JP 3-124519 has a similar arrangement but pairs of jaws for the series of transverse seals in each direction are mounted on a single belt on which they are relatively pivotable to open and close on the tubular web, and they are also intended simultaneously to sever the individual packets from the tube.

It has however been difficult to control the operation of sealing jaws mounted on circulating endless belts to produce uniform results without employing complex means for regulating the pressure between the jaws with the required degree of precision. This can be particularly critical at the point at which the jaws are closing on each other when they are being subject to acceleration forces and impacting of the sealing jaws together can produce transient disturbances. The problems of control increase with higher operating speeds. The introduction of supplementary mechanisms to hold the jaws steady in their operating positions as they travel with the belt would be difficult because of space limitations and would not only increase the construction costs but also lead to increased maintenance costs and downtime. For some or all of these reasons, the possible rate of operation of an apparatus based on these earlier proposals is limited.

According to a further aspect of the present invention, there is provided an apparatus for compartmenting a tubular web of sealable material at intervals along its length, comprising two pairs of rotors provided with radially projecting arms carrying sealing elements on their radially outer extremities and having their rotary axes in a common plane, each pair of said rotors having parallel axes and rotating in opposite directions to bring their sealing elements together for engaging the web between said elements to form transverse seals in the web, the respective pairs of rotors having mutually transverse rotary axes, and means being provided for synchronising the movements of the pairs of rotors so that said seals are formed by the pairs of devices in alternation to each other in mutually transverse directions across said web.

The apparatus is able to form the successive mutually transverse seals across the width of a tubular web while maintaining the progress of that web at a substantially uniform speed. The essentially circular motion of the rotors allows operating speeds significantly greater than those achieved by the previously proposed forms of apparatus referred to above. In a simplified arrangement, however, if flat packets are required, the invention is also able to provide an apparatus with a single pair of the said rotors, which will then make each seal between successive packets.

In a preferred form of the apparatus, said radially outer extremities of the rotor arms have, for each mutually cooperating pair of sealing elements, respective bearer elements for mutual contact when said sealing elements are brought together in order to set a predetermined spacing between the opposed sealing elements. The spacing so set between the sealing elements, although it can normally be very small, is able to control the applied sealing pressure more closely.

It is particularly preferred if said bearer elements extend circumferentially in advance of the associated sealing elements in order to make said mutual contact before the pair of sealing elements come into cooperation with each other. The advance engagement of said bearer elements need similarly only be small but it can ensure that dynamic disturbances from the initial contact between the pair of rotary sealing devices are avoided or at least do not affect the sealing process. Both these functions of the bearer elements can enhance the uniformity of sealing.

Advantageously, after the series of transverse seals have been formed, the compartmented web passes through a similar arrangement of pairs of mutually transverse rotors which have cutting elements in place of sealing elements to sever the web at the seals to produce the individual packets.

In yet another aspect of the invention, a method is provided for producing packets of flowable material in which a tubular web of packaging material is formed around a descending guide through which the filling material is fed, doses of the filling material are separated from the material in the guide at or adjacent the bottom of the guide and ejected into the tubular web, the packets are formed in the web by making transverse seals across the web adjacent the bottom of the guide to compartment the web, and said packets are subsequently separated by severing the web at said seals.

Figure 2:
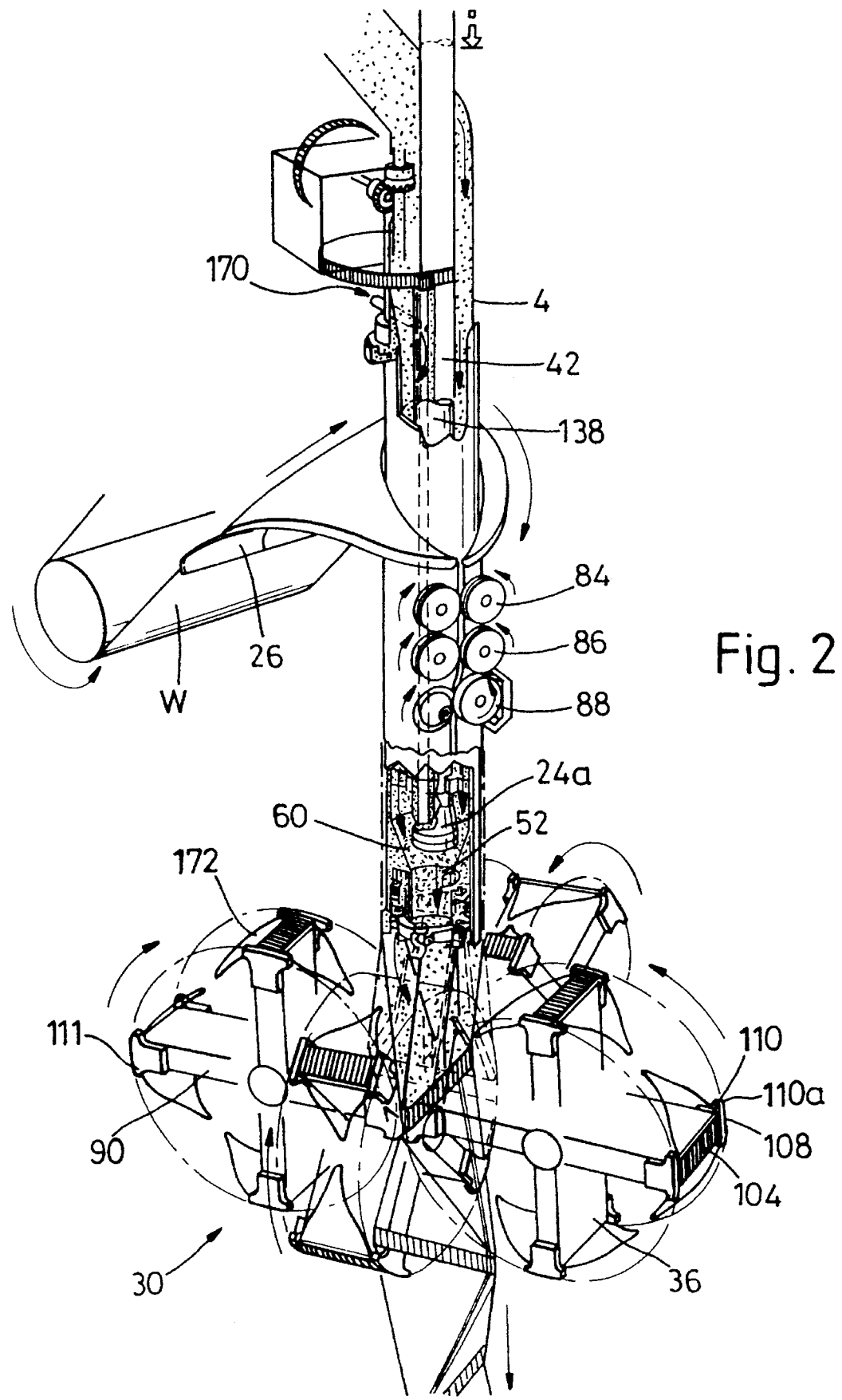
Figure 3:
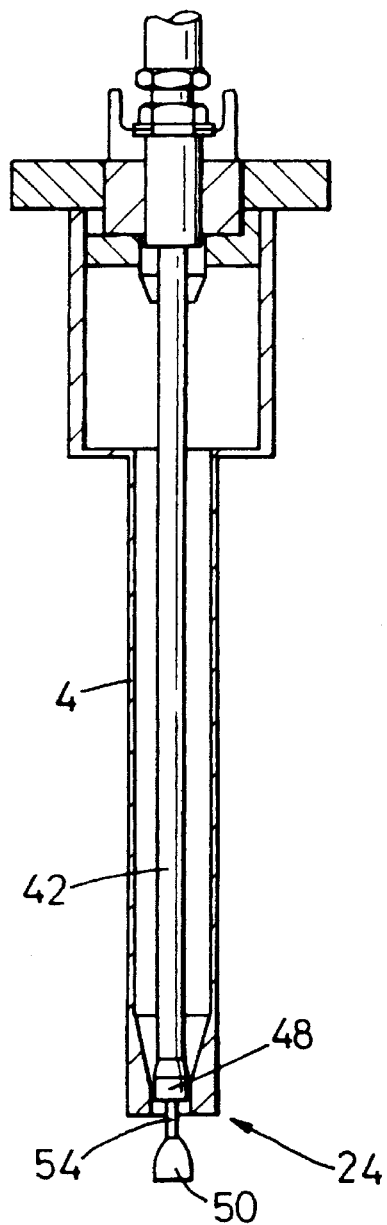
Figure 4:
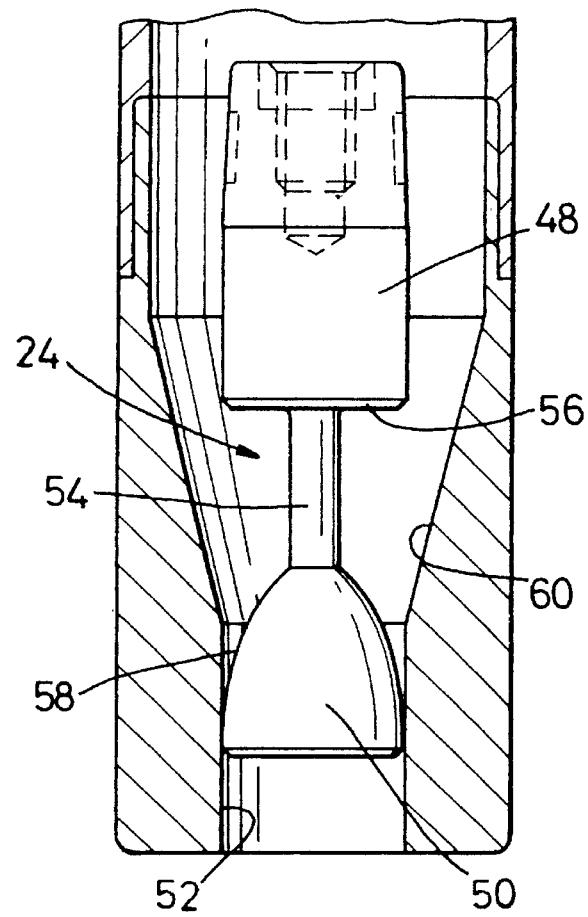
Figure 5:
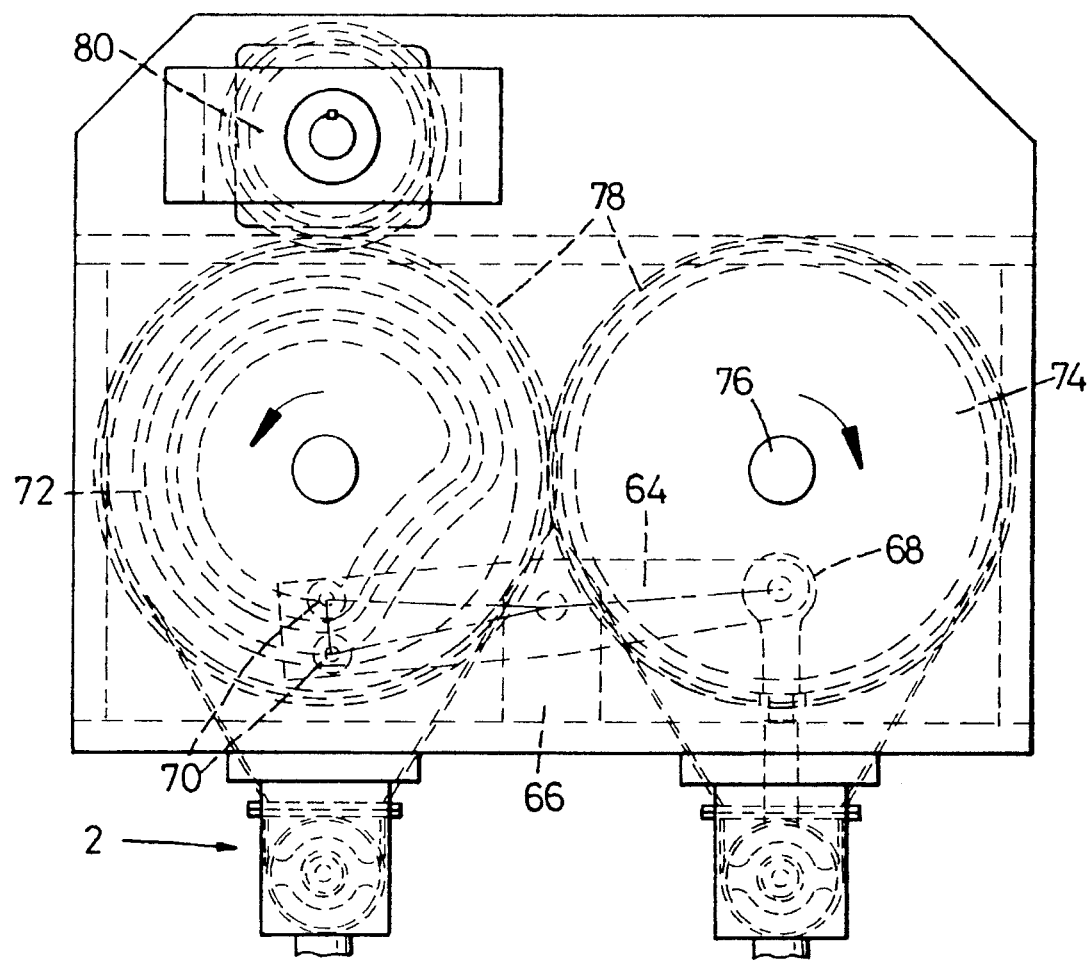
Figure 6:
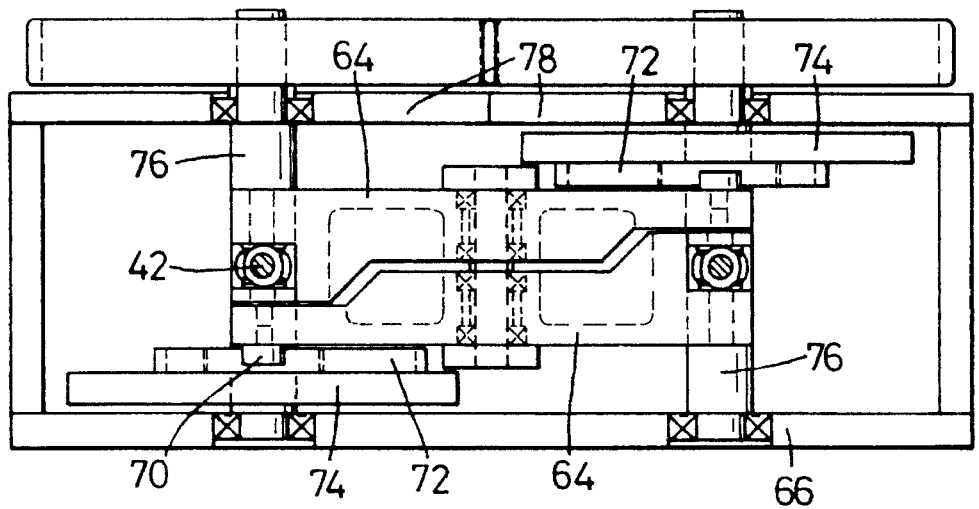
Figure 7:
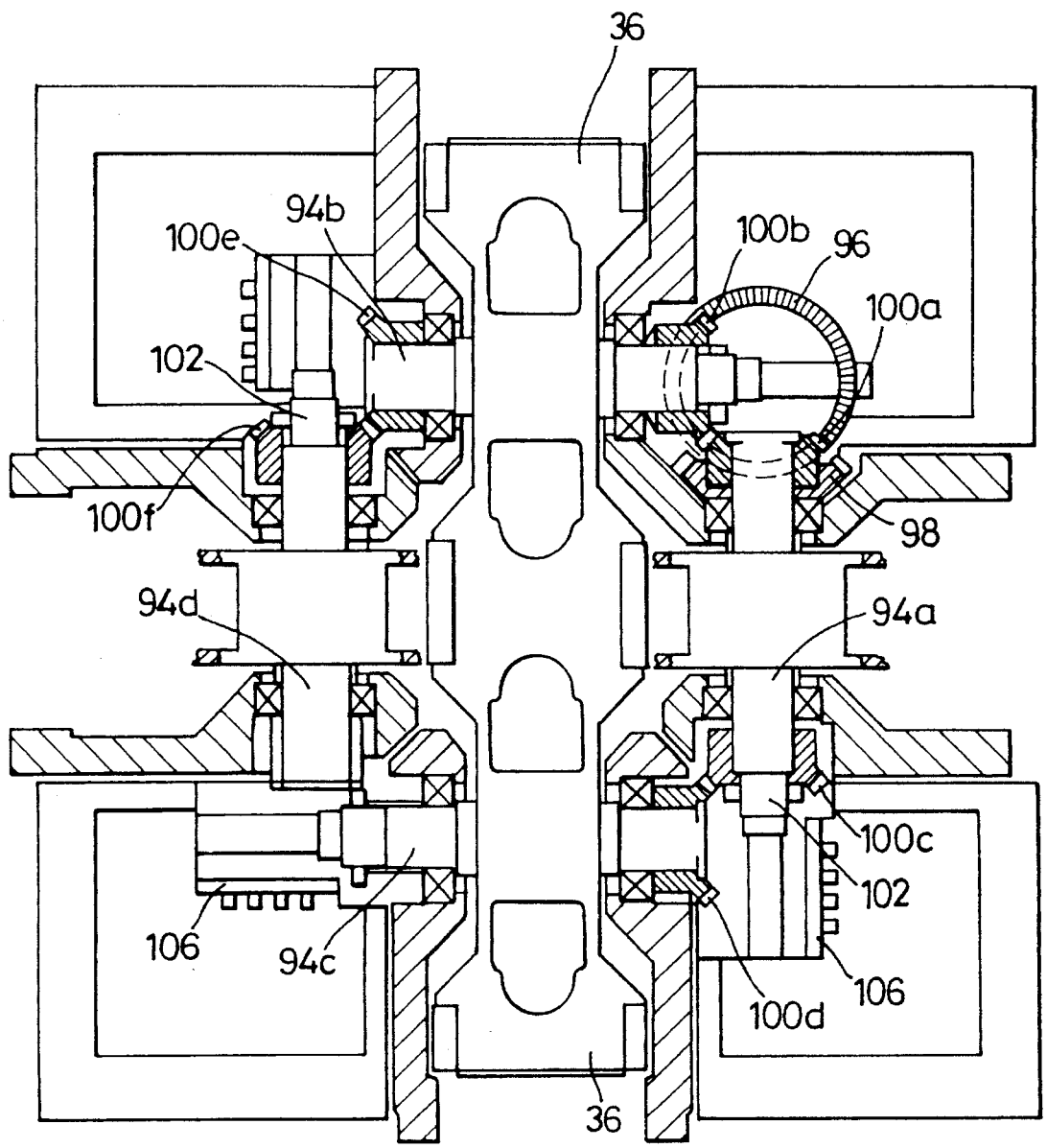
Figure 8:
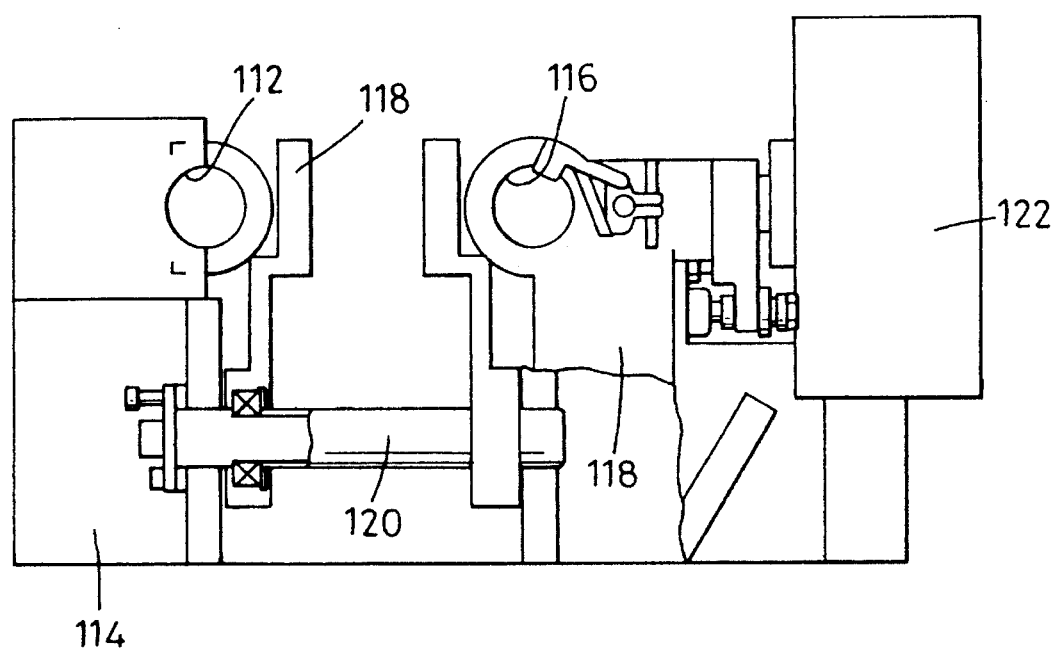
Figure 9:
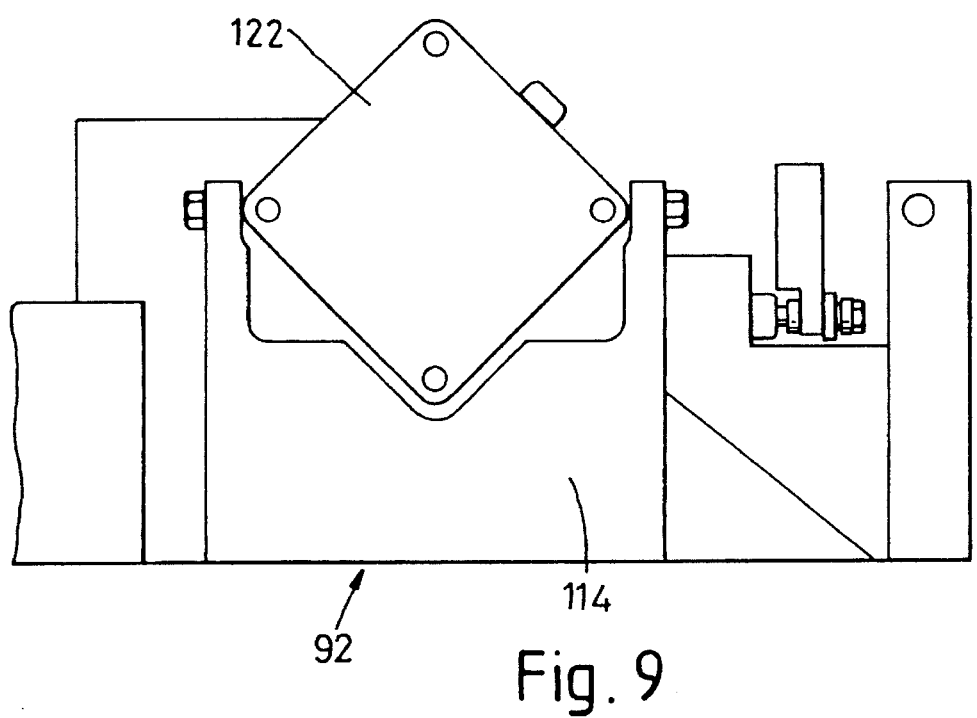
Figure 10:
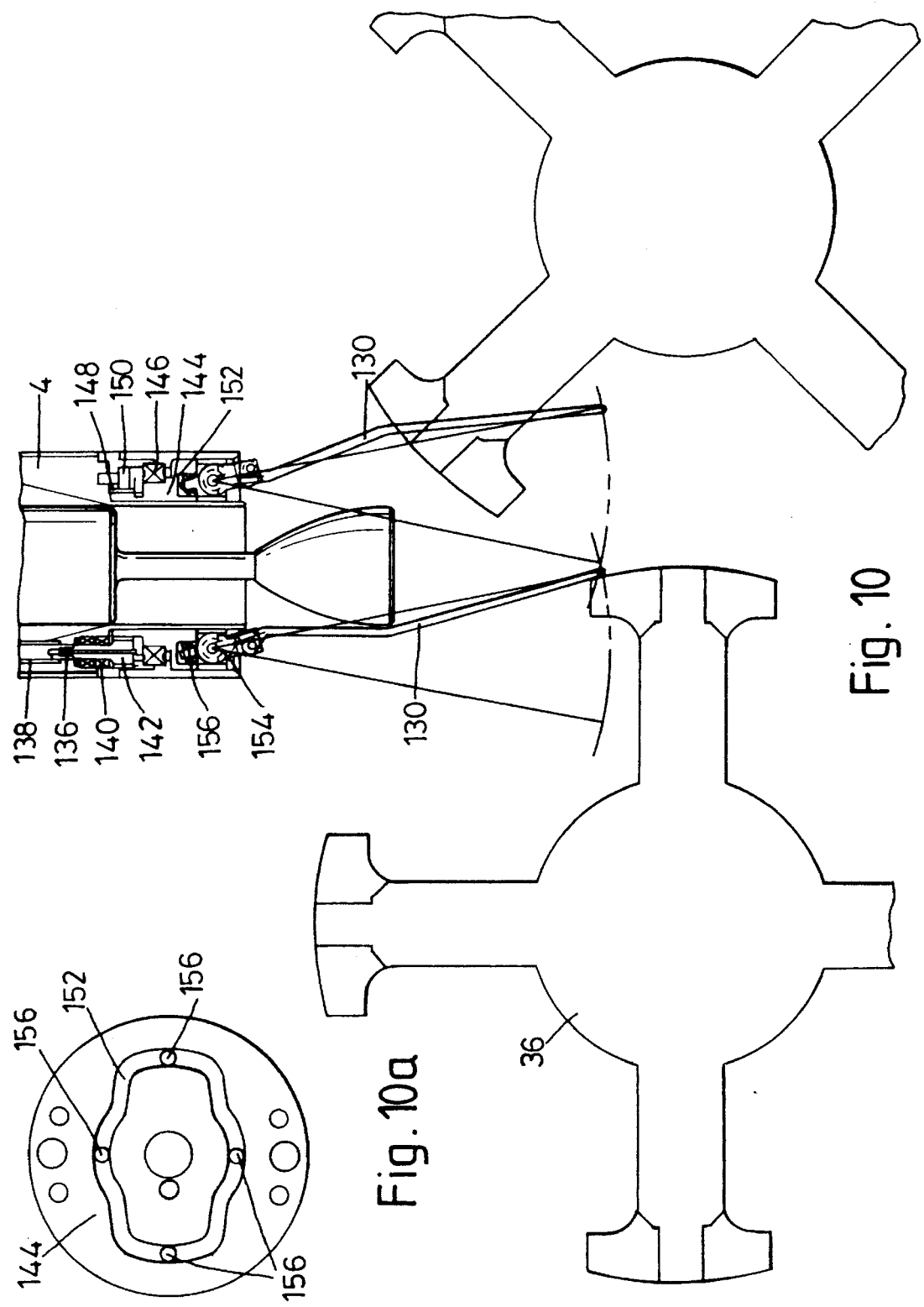
Figure 11:
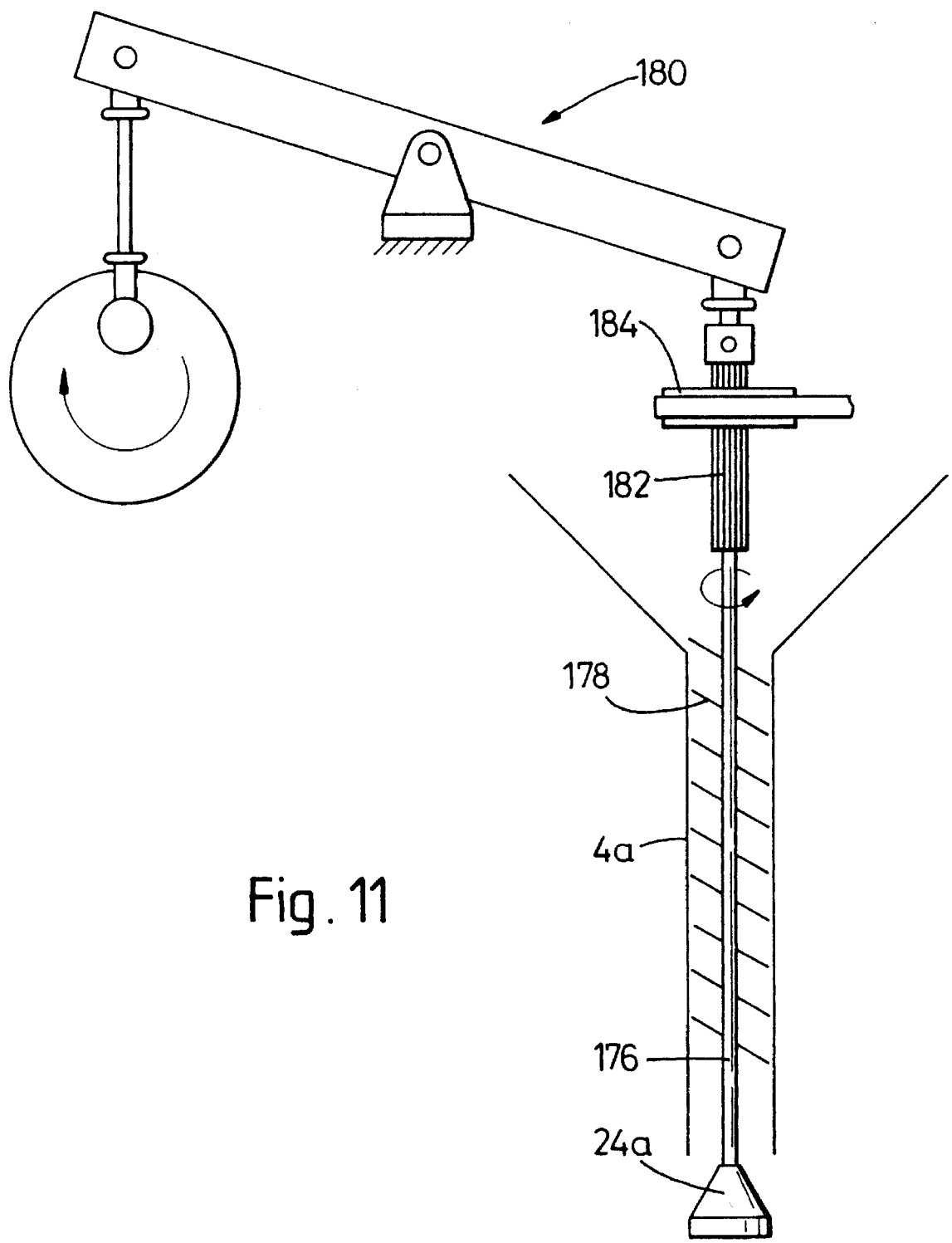

The invention will be described in more detail, by way of example, with reference to the accompanying diagrammatic drawings, in which:

FIG. 1 is a schematic illustration of a first packet forming and filling apparatus according to the invention, FIG. 2 is a more detailed illustration of part of the apparatus of FIG. 1 to a larger scale, FIG. 3 illustrates a filling hopper and dispensing valve of the apparatus of FIG. 1, FIG. 4 shows the dispensing valve of FIG. 3 to a larger scale, FIGS. 5 and 6 are front and plan views of a driving mechanism for the dispensing valves of the apparatus of FIG. 1, FIG. 7 is a partly sectioned plan view showing one pair of the rotary sealing devices, FIGS. 8 and 9 illustrate a carrier for one of the rotary sealing devices in side and end views respectively, FIG. 10 as a view of the apparatus in FIG. 1 in the region of the dispensing valve and rotary sealing devices illustrating means employed to flatten the tubular web prior to the operating of each of the rotary sealing FIG. 10a is a detail illustration of the profile of the cam groove in the means of FIG. 10, and FIG. 11 is a schematic illustration of a modified form of dispensing apparatus for the filler material.

The apparatus as illustrated in FIG. 1 has two parallel production paths A,B each being supplied from hopper means (not shown) with a flowable material to be packaged, such as an infusion material. In each path the material is fed to a weight control means 2 at the head of a feeder tube 4. Generally conventional web supply means 6 draw a web W of packaging material from one reel of a pair of supply reels 12 along a supply path that is provided with tension control means 14 and slitter means 16 where the original web W is divided lengthwise to form respective webs W' for the paths A, B. In each path, the web W is directed into tube-forming means 18 and the tubular web is filled with doses of flowable material as it is formed into individual packets by sealing and cutting means 20 below the tube.

As the apparatus of FIG. 1 is identical for each path A,B it will be described in more detail with reference to only one path in the following.

The flow of material as regulated by weight control means 2, which may take any conventional form of throttle valve, into the tube 4 is controlled at the lower end of the tube by a valve 24 which is reciprocated to deliver set doses of the material from the tube. The packaging web has meanwhile been fed over a shaping guide 26 near the upper end of the tube 4. Here the initially flat web turns downwards from an upwardly inclined path to take up the tubular form of the tube exterior and is drawn down the tube while its opposite side edges are sealed together as it approaches the lower end of the tube. Immediately below the feed tube the web is first sealed transversely at intervals in synchronism with the delivery of the doses of particulate filling by the valve 24 to form individual packets containing doses of the material, and the chain of packets is then separated by a cutting operation.

The transverse sealing means 30 for each path comprise two pairs of rotors 36 which will be described in further detail below, the axes of the two pairs of rotors being at 90° to each other and to the web axis. The arms of the rotors 36 interdigitate or interlace to operate in alternation on the web in order to produce tetrahedral-form packets. In the form illustrated, the apparatus has a corresponding arrangement of cutting rotors 38. It is of course possible, however, to utilize the invention with a single arrangement of interlacing rotors, eg. the four rotors 36, which seal and cut the tubular web in a single operation, instead of having these operations performed serially.

The feed means for dosing the flowable material are illustrated in more detail in FIGS. 2 to 4. A continuous flow of the material is regulated by the weight control means to fall at a predetermined rate into the vertical tube 4. Within the tube is a drive rod 42 carrying the valve 24 on its lower end. The drive rod 42 extends through the tube from reciprocating drive means 46 best shown in FIGS. 5 and 6. FIG. 3 shows a first form of the valve in its lowermost position in the tube bottom outlet and FIG. 4 shows it in its uppermost position.

As shown in FIGS. 3 and 4, the valve 24 has a dumb-bell form body in which the larger diameter upper and lower ends 48, 50 are each able to slide sealingly in the tube outlet bore 52. An intermediate stem 54 of the valve extends between flat lower face 56 of the upper end and the opposed ogive form face 58 of the lower end. In its fully retracted state of FIG. 4 with the lower end of the valve body in the tube outlet bore, the stem is located within a tapered portion 60 of the tube bore which extends from the outlet bore 52 at a steep angle. In this position the particulate material delivered into the tube is able to fall into the space surrounding the valve stem 54.

As the valve 24 is displaced downwards towards the opposite end position shown in FIG. 3 in which the stem extends through the outlet bore 52, the material is carried through the outlet bore and discharged from the tube. The valve 44 is reciprocated at high speed so that a plug-like mass of material around the stem is entrained by the valve in its downward descent, the quantity of material being relatively precisely determined by this action. As the valve slows approaching the end of its downward stroke, the shaped face 58 of the lower end of the valve helps to disperse the particulate material before the return stroke.

The steep taper 60 above the outlet bore 52 ensures that during the return stroke the space around the stem is quickly filled with further material in the tube as the lower end of the valve body closes the valve outlet. It is found, however, that if the rate of reciprocation of the valve body is increased above a certain speed, depending on the characteristics of the particulate material, it is no longer necessary to seal the bore 52 as none of the material is able to escape in free fall. The valve body then terminates at the lower face 56, the foreshortened body closing the bottom of tube only to determine the end of a dose. This alternative valve body 24a is shown in FIG. 2.

In the illustrated example the movements of the valve drive rods 42 are controlled by cams, but is of course possible to employ other mechanisms such as bar linkages. The drive mechanism shown in FIGS. 5 and 6 operates both valves and in each case the drive means for the rod 42 comprises a lever 64 pivoted to the fixed frame 66 of the apparatus in its middle region and having one end journalled to an eye 68 on the upper end of the drive rod. The opposite end of the lever carries a pair of rollers 70 which embrace a cam track 72 on a cam disc 74. The two cam discs 74 for the respective feed means of the paths A, B are secured to parallel shafts 76 that also carry meshing gear wheels 78 through which the drive of a main motor 80 is transmitted to rotate the cam discs 74 in opposite directions.

The counter-rotation of the discs 74 balances out transverse forces. As the plan view in FIG. 6 indicates, for further balancing of the mechanism during operation, the two cam discs 74 are placed on opposite sides of the frame in an inverted symmetrical arrangement in the central plane of which lie the axes of the two drive rods 42. Because of these measures the arrangement is capable of operating at relatively high speeds, eg. significantly above 500 cycles per minute, without generating excessive out-of-balance forces.

While the doses of particulate material are being ejected from the bottom of the tube, the web is drawn down the outer face of the tube by pairs of rollers. These include pairs of heating and pressing rollers 84, 86 between which the opposite edges of the web are sealed together longitudinally with a butt weld. The welded seam is then laid down against the tubular web by a roller and disc pair 88. It is of course possible to form a lap welded seam instead.

The doses of particulate material are ejected into the tubular web in synchronism with the operation of the sealing rotors 36 which form the packets containing individual doses of material. It will be noted that the tube 4 has its outlet end between the rotors so that it discharges the doses immediately adjacent the transverse sealing station.

The two pairs of rotors 36 of the transverse sealing means 30, each have four arms 90 spaced at equiangular intervals, as shown in FIG. 2, supported in a carrier 92 (FIGS. 8 and 9). As shown in FIG. 7, the rotors of each pair are mounted on parallel shafts 94a–94d and the pairs of shafts 94a, 94d and 94b, 94c are at right angles to each other. The rotors are driven from a bevel gear 96 rotating on a vertical axis which has a common intersection with the two rotor shafts 94a, 94b. Fixed to the shaft 94a is a bevel gear 98 meshing with the gear 96. Rigidly fixed to the gear 98 is a smaller diameter bevel gear 100a which meshes with a bevel gear 100b fixed to the adjacent shaft 94b. At the opposite end of the shaft 94a a further pair of bevel gears 100c, 100d similarly connect the shafts 94a, 94c and a final pair of bevel gears 100e, 100f transmit the drive from the shaft 94b to the shaft 94d. Phase adjustment mechanisms 102 may be provided for angular adjustment between the gears of each meshing pair 100a, 100b etc. to allow greater manufacturing tolerances to be used without affecting the equalization of the distances between successive seals. By these means the pairs of rotors rotate in synchronism with the arms 90 of one pair of rotors 45° out of phase with the arms of the other pair. The positioning of the pairs of sealing rotors at 90° to each other of course similarly orientates the successive heat seals transversely to each other, so that the web W is compartmented into a series of tetrahedral-like shapes.

Each arm 90 has a rectangular anvil face 104 at its outer periphery into which is set an electrical resistance heater and close to which extends a thermocouple for controlling the heating of the anvil face by the heater. These elements may be of conventional form and are not illustrated. FIG. 7 shows the slip ring housings 106 on the shafts through which the electrical connections are made to the heaters and thermocouples. The active heating areas of the anvil faces on one rotor of each pair, namely the rotors on the shafts 94a, 94b, are wider in the peripheral direction than the other. The width of the narrower faces can then determine reliably the width of the transverse seals in the web even if the co-operating anvil faces are not precisely synchronised.

Bearer faces 108 are provided at the laterally outer ends of each anvil face 104. The curved bearer faces 108 are concentric to the rotor and the anvil heating faces over main portions where they are circumferentially coincident with those heating faces. The bearer faces continue over forwardly projecting horns 110 which are inclined relative to an arc centered on the rotor axis; namely, from their leading edges 110a at a minimum distance from the axis the surfaces of the horns 110 extend at a progressively increasing radius from the rotor axis until at the concentric main portions they lie at a slightly larger radius than the heater faces. That is to say, the co-operating heater faces have complementary crimping patterns which have a maximum radius greater than the bearer face main portions, but their mean radius is less than the radius of the bearer face main portions. The drawings also show inclined trailing horns 111 in mirror image to the leading horns 110. These trailing horns 111 help to reduce or avoid vibration as the bearer faces move out of contact with each other.

The rotors run with the main portions of the bearer faces at a slight interference fit so that the bearer faces serve as lead-in elements, their horns building up an initial light pressure until the web is nipped between the active heating areas of an opposed pair of anvil faces. When the main bearer face portions are in contact there is a clearance between the anvil faces, sufficient to ensure that a predetermined pressure is applied to make the transverse sealing welds as the heated anvil faces come against the web. The progressively closing contact of the horns ahead of the anvil faces helps to ensure vibrations are not set up which would destabilize the pressure conditions between the anvil faces, and that there is not a sudden application of heat and pressure to the web which might cause it to be severed prematurely.

The controlled clearance between the cooperating anvil faces created by the their bearer faces ensures that pressure is applied when the web is heated to make the transverse seals, but means are also provided to ensure the pressure values are kept in a range which will allow a satisfactory seal to be reliably formed. For this purpose, one of the shafts of each pair of rotors, namely the shafts 94a, 94b is mounted in a bore 112 in a fixed main part 114 of the frame while the other shaft 94c, 94d of each pair of rotors is mounted in a bore 116 in respective yokes 118 forming auxiliary parts of the frame. The yokes 118 provide a measure of compliance for their respective rotors, each yoke being pivotable on a bar 120 about an axis parallel to the axes of the respective pair of rotors. Behind each auxiliary frame part or yoke 118 a pneumatic cylinder 122 is mounted on the main frame part. When a pneumatic cylinder is pressurized, it urges its respective auxiliary frame part and rotor forwards towards the other rotor of the pair by a pivoting movement on the bar 120 and generates a more uniform contact pressure between the rotor arms. The required amount of movement of the axis of the adjustable rotor can be small, eg. of the order of tens of microns, so it does not disturb the meshing of the gears through which the shafts 94c, 94d are driven.

To assist the flattening of the tubular web as it comes between the rotors, so as to minimise any risk of creasing the web material at the seals, spreader arms 130 depend from the tube 4 as is shown in FIG. 10. The figure shows one pair of two mutually transverse pairs of spreader arms 130 extending from the tube. The arms are illustrated one in a fully closed position, close to the tube axis, and the other in a fully open position away from the axis, but in use each pair of arms will always be symmetrically disposed on opposite sides of the central axis. The two arms thus swing in opposite directions to open and close the space between them in synchronism with the rotation of their associated pair of rotors, each pair of arms moving 180° out of phase from the other pair.

Each pair of arms is associated with the pair of rotors whose rotary axes lie parallel to the plane of movement of the arms in order to spread the tubular web in line with the pair of sealing rotor faces between which the web is about to be nipped. The arms depend to a short distance above the common plane of the rotor axes and each pair of arms reaches its fully open position immediately before a transverse seal begins to be formed in the web by its associated pair of rotors.

The arms are driven by a rotary input shaft 136 extending axially along the tube 4 but enclosed in a tubular cover 138 to prevent damage to the dosing material as it passes down the tube. The shaft 136 is supported in bearings in the tube wall, only the lower bearing 140 being shown, and it has a pinion 142 fixed to its lower end, below the bearing 140. A collar 144 rotatably mounted on bearings 146 in the tube 4 surrounds the body of the dosing valve 24 and comprises a ring gear 148 meshing with the pinion 142 and with a plurality of idler wheels 150 supported in the tube wall angularly spaced from the pinion 142.

A cam groove 152 is formed in the bottom wall of the collar 144 and respective pivot mountings 154 from which the arms depend have follower rollers 156 which extend into the cam groove. The cam groove 152 is shown in FIG. 10a with the two pairs of follower rollers 156 at the fully open and fully closed positions of their pairs of arms, respectively. As FIG. 10a shows, the cam groove profile has two diametrically opposite lobes and each pair of arms 130 is thus swung inwards and outwards twice with each revolution of the collar 144. The profile provides dwell periods for the arms in the fully open and fully closed states occupying about 30° of the rotation of the collar in each case.

Pressure gas may be injected into the tube 4 through an inlet 170 (FIG. 2) to maintain the spreader arm mechanism clean and gas injection may also be arranged to be used, in addition to or in place of the spreader arms 130, to inflate the tubular web as each dose of filling material is dispensed.

The rotors 38 of the packet severing means 32 are constructed similarly to the packet sealing rotors 36 with the pairs of rotors arranged transversely to each other, but in place of the heated sealing anvils, one rotor of each pair carries heated cutter blades (not shown) on its arms which bear on reaction anvils (not shown) on the arms of the other rotor to sever the packets from each other in the middle of each transverse sealing weld. For improved accuracy, the rotors carrying the cutter blades are those on the shafts corresponding to the shafts 94a, 94b in FIG. 7.

For additional guidance of the packets passing between them, the rotors 36, 38 may have guide faces 172 extending from the edges of the rotor arms and inclined in a spiral manner towards the rotor axes. As the rotors turn, the opposed pairs of guide faces define bounding paths that conform substantially to the faces of a tetrahedron having a pair of opposite end edges defined by the sealing or cutting lines produced by the rotors and having planar faces therebetween.

The packet sealing rotors 36 and the severing means 38 are oriented with their rotor axes in planes angularly offset from the welding plane of the butt seal welding rollers 84,86 which form the longitudinal seam in the tubular web. In the drawings the angle of obliquity is 45°. This arrangement make it easier to ensure that the butt seam can lie flat against the packet at the transverse seams.

In FIG. 11, tube 4a and valve 24a corresponds to the tube 4 and valve 24 as already described, the valve 24a is mounted on a stem 176 extending coaxially through the tube 4a and having an auger flight 178 secured to its periphery. The valve 24 is reciprocated as before by a drive mechanism 180. On a portion projecting above the tube 4a, the stem 176 is provided with axial teeth 182 engaged by internal teeth (not shown) on a belt-driven pulley 184 supported at a fixed height. The stem is thus rotated as it reciprocates and the auger drives material fed into the top of the tube in a steady stream to the dosing valve 24a. This arrangement is particularly suitable for high speed operation and the valve 24a is accordingly illustrated with a foreshortened body having only the single enlarged portion corresponding to the portion 48 described above.

It will be understood from the foregoing, without further description how the simplified form of the mechanism referred to earlier, employing a single pair of rotors for compartmenting the web and a parallel pair of rotors for severing the compartmented packets can be constructed to produce flat packets containing a flowable material.

We claim:

1. Apparatus for dispensing doses of a flowable material into a tubular web, comprising an elongate conduit for the supply of said material, means for drawing a web of packaging material along the exterior of said conduit and past an outlet end thereof, tube-forming means adjacent the conduit for forming said web into a closed tube around the conduit, said conduit comprising a cylindrical inner peripheral wall at said outlet end, and valve means comprising a valve body at or adjacent said outlet end of the conduit means for reciprocating said valve body longitudinally of said conduit between said opposite end positions in one of which the valve body fits slidingly within said inner peripheral wall to close said outlet end for dispensing doses of said material into the tubular web by the ejection of the material by said valve body in its movement to said one end position.

2. Apparatus according to claim 1 comprising means for maintaining a positive pressure within the conduit for controlling the shape of said tubular web adjacent the conduit outlet end.

3. Apparatus according to claim 1 wherein the valve means comprises a stem extending within the conduit over the length of the conduit to reciprocating drive means.

4. Apparatus according to claim 1 wherein the conduit has a cross-section at its outlet end tapering towards the exterior, said tapering cross-section preceding said cylindrical inner peripheral wall.

5. Apparatus according to claim 1 wherein the valve means comprises a closure body having portions spaced in said direction of reciprocation and having respective closing positions at opposite ends of the reciprocating motion.

6. Apparatus according to claim 5 wherein the closure body portion outermost with respect to said outlet end has a cross-section that tapers in a direction counter to the direction of material flow.

7. Apparatus according to claim 1 comprising a feed screw within the conduit for controlling the flow of material through the conduit.

8. Apparatus according to claim 1 wherein guide means project beyond said conduit outlet end for shaping said tubular web.

9. Apparatus for compartmenting a tubular web of sealable material at intervals along its length, comprising two pairs of rotors, each rotor having a rotary axis and arms projecting radially with respect to its rotary axis, radially outer extremities of said radially projecting arms carrying sealing elements, the rotary axes of said two pairs of rotors lying in a common plane, said rotors forming respective opposed pairs in which said axes of each pair of said rotors are parallel to each other and the rotors of each said pair rotate in opposite directions to bring pairs of said sealing elements together for engaging the web between said elements to form transverse seals in the web, spacing means on said rotor arms determining a spacing between the sealing elements when they engage the web between them, said parallel axes of one said pair of rotors being transverse to the rotary axes of the other said pair of rotors and means being provided for synchronizing the movements of said pairs of rotors so that said seals are formed by the pairs of sealing elements in alternation in mutually transverse directions across said web.

10. Apparatus for dispensing doses of a flowable material from a conduit into a tubular web, comprising valve means at or adjacent an exit end of the conduit and connected to reciprocating drive means for expelling said material in discrete doses, the valve means comprising a tapering outlet passage in said conduit adjacent the exit end and a plug member reciprocable in the conduit by said drive means to and from an extended position in which an enlarged portion of the plug member substantially fills a smaller cross-section region of said tapering outlet passage, the movement to said extended position being arranged to expel from said exit end a dose of material allowed to pass said enlarged position.

11. Apparatus for compartmenting a tubular web of sealable material at intervals along its length, comprising two pairs of rotors provided with radially projecting arms comprising radially outer extremities carrying sealing elements, the pairs of rotors having rotary axes in a common plane, said rotary axes of each said pair of said rotors being disposed parallel to each other and said rotors of each pair of rotors rotating in opposite directions to bring respective pairs of said sealing elements on their radially projecting arms together for engaging the web between said elements to form transverse seals in the web, the rotary axes of the respective pairs of rotors being mutually transversely disposed and means being provided for synchronising the movements of said pairs of rotors so that said seals are formed by said pairs of elements in alternation to each other in mutually transverse directions across said web.

12. Apparatus according to claim 11 wherein each rotor has four arms spaced at equal angles about the rotary axis.

13. Apparatus according to claim 11 wherein said radially outer extremities of the rotor arms have, for each mutually cooperating pair of sealing elements, respective bearer elements for mutual contact when said sealing elements are brought together in order to set a predetermined spacing between the opposed sealing elements.

14. Apparatus according to claim 13 wherein said bearer elements extend circumferentially in advance of their associated sealing element in order to make said mutual contact before the pair of sealing elements come into cooperation with each other.

15. Applications according to claim 13 wherein the bearer elements further comprise mutual contact means for influencing the relative location of the cooperating sealing elements in the direction of their rotary axes.

16. Apparatus according to claim 11 wherein the rotors carry web guides extending rearwardly of the sealing elements in the direction of rotation.

17. Apparatus according to claim 11 comprising a further two pairs of rotors provided with radially projecting arms carrying cutting elements on their radially outer extremities and having their rotary axes in a common plane, each pair of said rotors having parallel axes and rotating in opposite directions, the respective pairs of rotors having mutually transverse rotary axes, means being provided for synchronising the movement of said further pairs of rotors with the pairs of rotors bearing sealing elements and said further pairs of rotors being arranged in the path of the compartmented web so that the cutting elements of the pairs of rotors sever the web at the transverse seals to divide the tubular web into a series of discrete sealed packets.

18. Apparatus according to claim 17 wherein said further rotors carry web guides extending rearwardly of the cutting elements in the direction of rotation.

19. Apparatus according to claim 11 wherein the rotor arms carrying the sealing means further include cutting means for performing combined sealing and cutting operations producing discrete packets from the tubular web.

20. Apparatus according to claim 11 wherein means are provided for relative displacement of the rotors of each pair towards and away from each other and biasing means are arranged to apply a predetermined force in said direction, whereby to determine the sealing and/or cutting pressure on the web material.

21. Apparatus for dispensing doses of a flowable material into a tubular web, comprising an elongate conduit for the supply of said material, means for drawing a web of packaging material along the exterior of said conduit and past an outlet end thereof, tube forming means adjacent the conduit for forming said web into a closed tube around the conduit, and valve means at or adjacent said outlet end of the conduit comprising a valve body and drive means for reciprocating the valve body longitudinally in said conduit, an inner peripheral wall of said conduit at said outlet end, an outer peripheral wall of said valve body cooperating with said conduit inner wall during the reciprocation of the valve body for intermittently opening and closing said outlet whereby to dispense doses of said material into the tubular web.

22. Apparatus according to claim 21 wherein said conduit inner peripheral wall defines a conduit cross-section that tapers towards the outlet end.

23. Apparatus according to claim 21 wherein said valve body outer peripheral wall tapers oppositely to the direction of dispensing of the material through said outlet end.

24. Apparatus for dispensing doses of a flowable material into a tubular web, comprising an elongate conduit for the supply of said material, means for drawing a web of packaging material along the exterior of said conduit and past an outlet end thereof, tube forming means adjacent the conduit for forming said web into a closed tube around the conduit, and valve means at or adjacent said outlet end of the conduit comprising a valve body and drive means for reciprocating the valve body longitudinally in said conduit, an inner peripheral wall of said conduit at said outlet end, an outer peripheral wall of said valve body cooperating therewith during the reciprocation of the valve body for intermittently opening said outlet during the withdrawal of the valve body inwardly of the outlet end to permit a dose of the material to enter said outlet end, said conduit inner wall defining a conduit cross-section that tapers in the direction of flow of the material through the outlet end and said valve body outer peripheral wall defining a body cross-section that tapers in the opposite direction.

* * * * *